United States Patent [19]

McLean

[11] Patent Number: 4,516,391
[45] Date of Patent: May 14, 1985

[54] LIGHT HAY BAFFLE FOR DISC MOWER-CONDITIONER

[75] Inventor: Kenneth W. McLean, New Holland, Pa.

[73] Assignee: Sperry Corporation, New Holland, Pa.

[21] Appl. No.: 585,675

[22] Filed: Mar. 2, 1984

[51] Int. Cl.³ ............................................. A01D 43/10
[52] U.S. Cl. ................................. 56/16.4; 56/DIG. 1
[58] Field of Search ................. 56/16.4, 13.6, DIG. 1, 56/192

[56] References Cited

U.S. PATENT DOCUMENTS 4,172,353 10/1979 Meek et al. ..................... 56/DIG. 1
4,233,803 11/1980 Davis .............................. 56/DIG. 1

Primary Examiner—Jay N. Eskovitz
Attorney, Agent, or Firm—Larry W. Miller; Darrell F. Marquette; Frank A. Seemar

[57] ABSTRACT

A disc mower-conditioner having rotatable disc cutter units for severing standing crop material by impact action and a rotatable conditioning mechanism disposed rearwardly of the disc cutters to condition severed crop material is disclosed wherein a hat-shaped baffle is disposed above the disc cutters to restrict the movement of light crop material above the disc cutters and assist the feeding of crop material into the conditioning mechanism. The light hay baffle extends transversely and is mounted on opposing side sheets of the disc mower-conditioner. The light hay baffle includes an upper section having forwardly and rearwardly sloped portions meeting in an upper apex and a lower section having a generally planar horizontal portion and an upwardly sloping portion connected to the upper section. This baffle construction restricts the air turbulence caused by rotation of the disc cutters and conditioning mechanism and prevents material from accumulating on top of the baffle.

12 Claims, 4 Drawing Figures

LIGHT HAY BAFFLE FOR DISC MOWER-CONDITIONER

BACKGROUND OF THE INVENTION

The present invention relates generally to hay harvesting machines, commonly referred to as mower-conditioners, and, more particularly, to a light hay baffle for a disc mower-conditioner to improve the feeding characteristics for light crop material into the conditioning mechanism.

Mower-conditioners have been provided for the harvesting of hay for a number of years. A mower-conditioner severs standing crop material and conveys crop material rearwardly into a conditioning mechanism without depositing the severed crop upon the ground. A disc mower-conditioner is provided with a disc cutterbar having a number of transversely spaced rotatable cutter units operable to sever standing crop material by impact action and a conditioning mechanism mounted rearwardly of the disc cutterbar to receive and condition the severed crop material. Although the conditioning mechanism has undertaken many forms, a preferred embodiment utilizes a pair of generally vertically disposed intermeshing rubber rolls to crimp and/or crush severed crop material passing therebetween.

With the rotation of the rotatable disc cutter units and the rotation of the conditioning rolls, a certain degree of turbulent air flow is created. While most crops have sufficient mass to be unaffected by the turbulent air, some light leafy crops can be blown around above the disc cutterbar without feeding into the conditioning mechanism until there is sufficient accumulation. The resulting swath or windrow formed from the discharge of crop material from the conditioning mechanism becomes bunchy as a result of the slugs of light crop material feeding through, and does not dry uniformly. Accordingly, it would be desirable to improve the feeding characteristics for light crop material to provide a more uniform feed rate.

SUMMARY OF THE INVENTION

It is an object of this invention to overcome the aforementioned disadvantages of the prior art by providing a light hay baffle for disc mower-conditioner to improve the feeding of light crop into the conditioning mechanism.

It is another object of this invention to provide a light hay baffle construction that will prevent an accumulation of crop material thereon.

It is a feature of this invention that light crop material is uniformly fed by the disc cutterbar into the rearwardly disposed conditioning mechanism.

It is an advantage of this invention that windrows of crop material conditioned by this mower-conditioner will dry uniformly.

It is another feature of this invention to mount the light hay baffle between the side sheets of the header of the disc mower-conditioner above the disc cutter bar for a distance equivalent to the full length of the conditioning mechanism.

It is still another feature of this invention to construct the light hay baffle with a closed hat-shaped cross-sectional configuration to facilitate the feeding of crop material into the conditioning mechanism and prevent an accumulation of severed crop material and/or other debris on top of the light hay baffle.

It is yet another feature of this invention to provide the light hay baffle with a forwardly upwardly sloping portion to facilitate the feeding of tall crop material therebeneath.

It is still another object of this invention to provide a light hay baffle for a disc mower-conditioner that is durable in construction, inexpensive of manufacture, carefree of maintenance, facile in assemblage, and simple and effective in use.

These and other objects, features and advantages are accomplished according to the instant invention by providing a disc mower-conditioner having rotatable disc cutter units for severing standing crop material by impact action and a rotatable conditioning mechanism disposed rearwardly of the disc cutters to condition severed crop material, wherein a hat-shaped baffle is disposed above the disc cutters to restrict the movement of light crop material above the disc cutters and assist the feeding of crop material into the conditioning mechanism. The light hay baffle extends transversely and is mounted on opposing side sheets of the disc mower-conditioner. The light hay baffle includes an upper section having forwardly and rearwardly sloped portions meeting in an upper apex and a lower section having a generally planar horizontal portion and an upwardly sloping portion connected to the upper section. This baffle construction restricts the air turbulence caused by rotation of the disc cutters and conditioning mechanism and prevents material from accumulating on top of the baffle.

BRIEF DESCRIPTION OF THE DRAWINGS

The advantages of this invention will become apparent upon consideration of the following detailed description of the invention, especially when taken in conjunction with the accompanying drawings, wherein.

DETAILED DESCRIPTION OF THE PREFERRED EMBODIMENT

Figure 1:
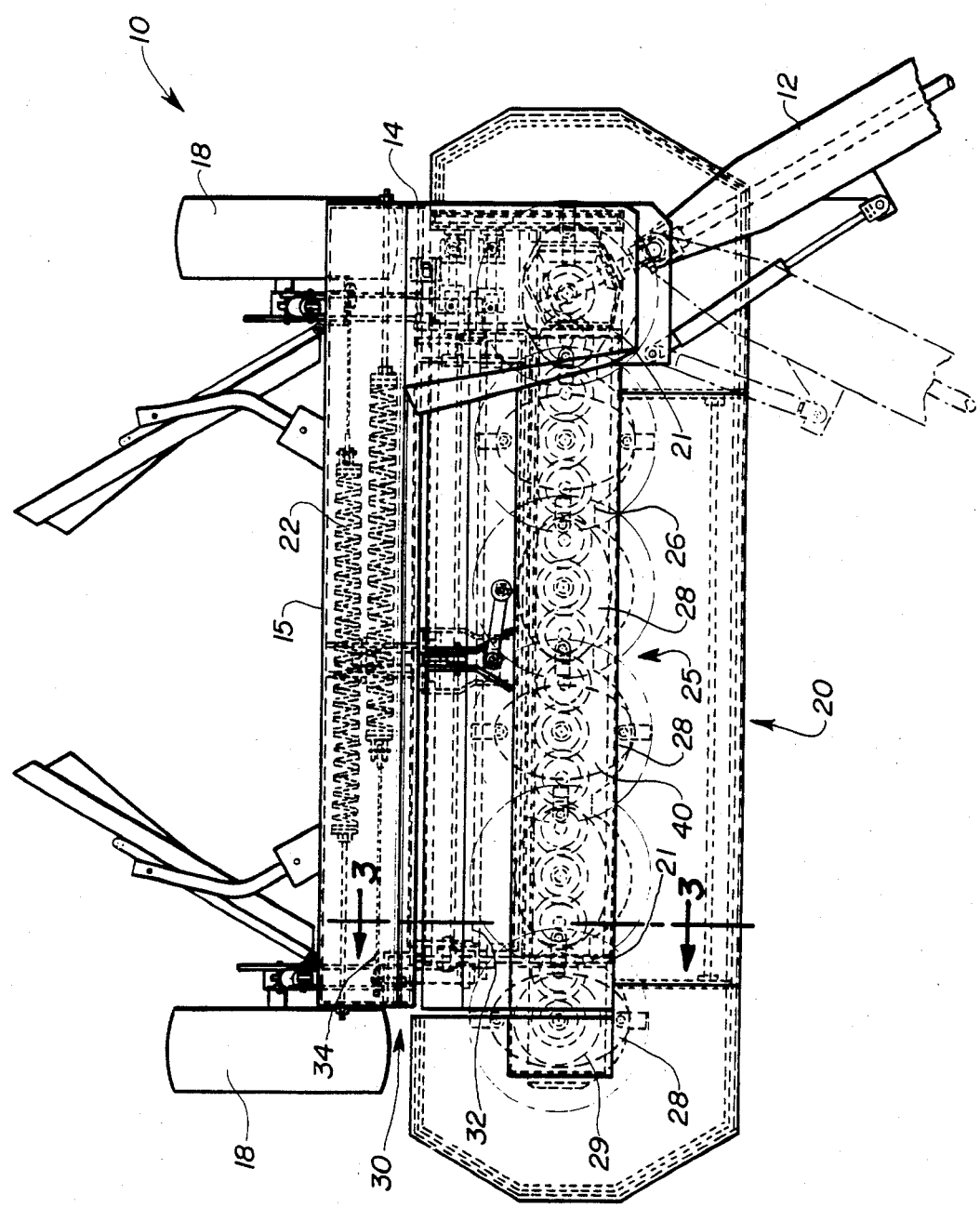
FIG. 1 is a top plan view of a disc mower-conditioner incorporating the principles of the instant invention, a portion of the draft member being broken away.

Referring now to the drawings and, particularly, to FIG. 1, a top plan view of a hay harvesting machine, commonly referred to as a disc mower-conditioner, can be seen. Any left and right references are used as a matter of convenience and are determined by standing at the rear of the mower-conditioner, facing the forward end, the direction of travel. The mower-conditioner 10 is shown in the form of a pull-type machine having a draft member 12 pivotally connected to the frame 14 of the machine 10. The frame 14 includes a main transverse support beam 15 to which are connected downwardly depending legs 17 mounting wheels 18 for mobilely supporting the machine 10 over the ground G, as best seen in FIG. 2.

Figure 2:
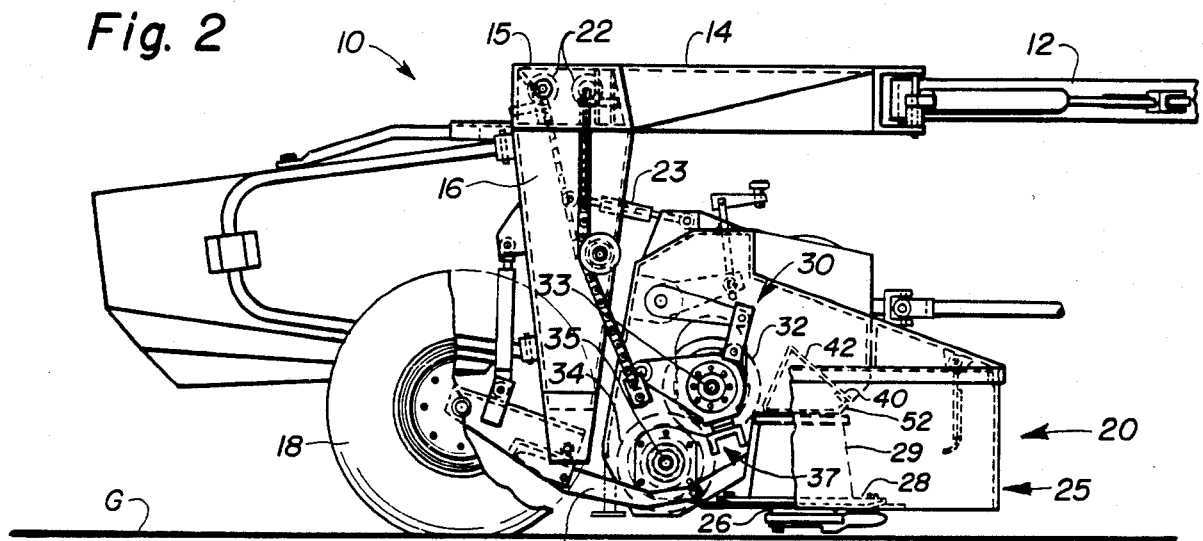
FIG. 2 is a side elevational view of the disc mower-conditioner seen in FIG. 1 with portions being broken away to better show the invention.

Referring to FIGS. 1 and 2, the mower-conditioner 10 includes a crop harvesting header 20 floatingly supported for movement with the ground G relative to the frame 14 by the counterbalancing mechanism 22 and upper and lower links 23,24 interconnecting the header 20 and the frame 14. The header 20 is provided with a crop cutting mechanism 25, seen in the form of a disc cutterbar 26, such as a Kuhn three meter, six rotor rotary cutterbar, having a plurality of transversely spaced disc cutter members 28 operable to sever standing crop material by an impact action. A conditioning mechanism 30 is mounted in the header 20 rearwardly of the cutting mechanism 25 to receive and condition crop material severed by the cutterbar 26.

Figure 3:
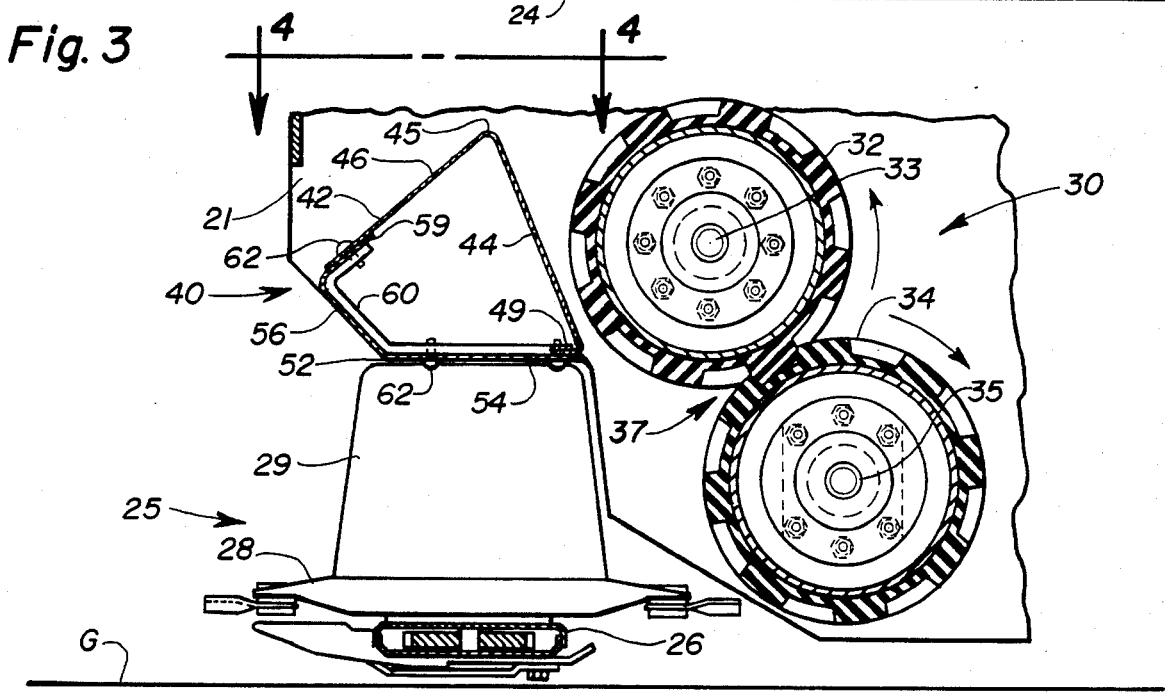
FIG. 3 is an enlarged partial cross-sectional view of the disc mower-conditioner taken along lines 3—3 of FIG. 1 to show the relationship between the light hay baffle and the conditioning mechanism and the disc cutterbar.

As can be seen in FIGS. 1-3, the conditioning mechanism 30 includes a pair of cooperable, generally vertically spaced transverse conditioning rolls 32,34 operable to condition severed crop material passing therebetween. Each roll 32,34 is rotatably supported in the header 20 with the axis of rotation 33 of the upper conditioning roll 32 being spaced slightly forwardly of the axis of rotation 35 of the lower conditioning roll 34, so that the nip 37 formed therebetween is facing slightly downwardly toward the disc cutterbar 26. The preferred embodiment of the conditioning roll construction shown is of the intermeshing lug design.

The driving of both the conditioning mechanism 30 and the disc cutterbar 26 is by conventional means. As one skilled in the art will readily realize, the rotational movement of both the conditioning rolls 32,34 and the cutter units 28 is sufficiently rapid as to create a turbulent air flow within the header 20, particularly immediately above the cutterbar 26. Light, leafy crop material severed by the disc cutter members 28 can be caught up in this turbulent air flow and not be fed into the conditioning rolls until a sufficient amount of crop material has accumulated to have a collective mass to enable the crop to overcome the turbulence and feed into the conditioning rolls 32,34.

To prevent the accumulation of light crop material within the air turbulence, a light hay baffle 40 is disposed above the cutterbar 26 immediately forward of the upper conditioning roll 32. The light hay baffle 40 is comprised of an upper section 42 having a rearwardly sloping portion 44 and a forwardly sloping portion 46 meeting in an upper apex 45, and a lower section 52 having a generally planar portion 54 and an upwardly forwardly sloping portion 56. The upper section 42 is joined to the lower section 52 by means of a flange 49 formed with the rearwardly sloping portion 44 and a flange 59 formed with the upwardly forwardly sloping portion 56, with fastening means, such as bolts, joining the flange 49 to the planar horizontal section 54 and joining the flange 59 to the forwardly sloping portion 46. The connection of the upper section 42 with the lower section 52 forms a hollow quadrangular beam having a generally hat-shaped cross-sectional configuration.

The end disc cutters 28, i.e., the opposing extreme transverse disc cutters 28, are provided with a truncated cone 29 to serve as a more aggressive conveyor of severed crop, as is well known to one skilled in the art. The light hay baffle 40 is disposed such that the generally planar horizontal portion is positioned slightly above the top of the truncated cone 29. As is best seen in FIG. 1, the rotation of the truncated cone 29 occurs outboard of the side sheet 21 of the header 20 at both transverse ends of the header 20.

Figure 4:
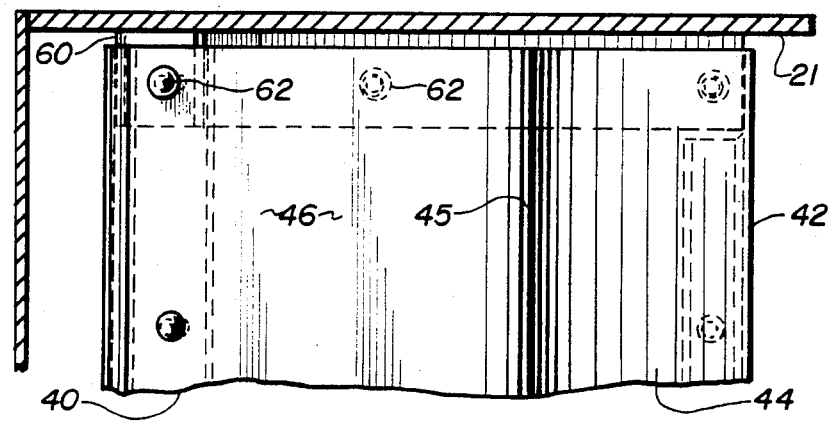
FIG. 4 is an enlarged partial cross-sectional view taken along lines 4—4 of FIG. 3 to show the mounting of the light hay baffle to the side sheet of the header.

Referring now to FIGS. 3 and 4, the light hay baffle 40 is mounted to the opposing side sheets 21 of the header 20 by means of a support flange or bracket 60 having a shape corresponding to the shape of the lower section 52 of the light hay baffle 40. Fastening bolts 62 detachably connect the light hay baffle 40 to the opposing support brackets 60. The light hay baffle spans the entire transverse width of the header 20 as defined by the opposing side sheets 21. The installation of the light hay baffle prevents light hay crop from being carried by the turbulent air above the cutterbar 26 without being fed into the conditioning mechanism 30. The upwardly forwardly sloping portion 56 of the lower section 52 facilitates the feeding of taller crop material over the cutterbar 26 for cutting and underneath the light hay baffle 40 into the conditioning rolls 32,34. The upper section 42 of the baffle 40 prevents the accumulation of crop material or other debris on the lower section 52 and thereby adding weight to the header 20 and preventing the accumulated crop material from being conditioned by the conditioning mechanism 30 and being deposited on the ground G.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific forms shown.

Having thus described the invention, what is claimed is:

1. A hay harvesting machine having a mobile frame including transversely spaced side sheets; crop conditioning means rotatably supported by said frame to condition crop received thereby; rotary cutting means supported by said frame forwardly of said conditioning means to sever standing crop material and convey the severed crop material rearwardly toward said conditioning means, said rotary cutting means having a plurality of transversely spaced disc cutters rotatably mounted on a transverse cutterbar, each said disc cutter having at least one knife mounted thereon to sever standing crop by impact action upon rotation of said disc cutters; and drive means for rotatably driving said conditioning means and said rotary cutting means, the improvement comprising:

a transverse baffle positioned above said rotary cutting means and forwardly of said conditioning means to assist in directing the flow of severed crop material from said rotary cutting means into said conditioning means.

2. The hay harvesting machine of claim 1 wherein said baffle extends between said side sheets.

3. The hay harvesting machine of claim 2 wherein said baffle includes an upper sloped section to prevent material from accumulating on top of said baffle.

4. The hay harvesting machine of claim 3 wherein said baffle includes a lower section defining a generally planar horizontal portion and an upwardly sloping portion contiguous with and forwardly of said horizontal portion.

5. The hay harvesting machine of claim 4 wherein said upper section includes a forwardly sloped portion and a rearwardly sloped portion meeting said forwardly sloped portion at an upper apex.

6. The hay harvesting machine of claim 5 wherein said upper section is connected to said lower section to form a hollow quadrangular beam.

7. The hay harvesting machine of claim 6 wherein said upper section and said lower section are individually formed members connected along their transverse lengths by means for fastening.

8. The hay harvesting machine of claim 5 wherein said crop conditioning means includes a pair of conditioning rolls rotatably supported by said frame about generally horizontal axes of rotation, the axis of rotation of one of said conditioning rolls being spaced vertically above the axis of rotation of the other of said conditioning rolls, said conditioning rolls being disposed in a cooperative relationship defining a nip therebetween.

9. The hay harvesting machine of claim 8 wherein said baffle is positioned forwardly of said upper roll and above said nip.

10. The hay harvesting machine of claim 5 said side sheets are provided with a support flange, said baffle being connected to the support flange on each said side sheet.

11. The hay harvesting machine of claim 10 wherein each said support flange has a shape that matches the shape of said lower section of said baffle.

12. The hay harvesting machine of claim 5 wherein the end disc cutter of said rotary cutting means adjacent each respective said side sheet is provided with a truncated cone member positioned on top of the disc cutter, said baffle being positioned above said truncated cones.

* * * * *